Dec. 17, 1946.  E. L. LARSON  2,412,587
CYLINDER LINER
Filed Nov. 15, 1945
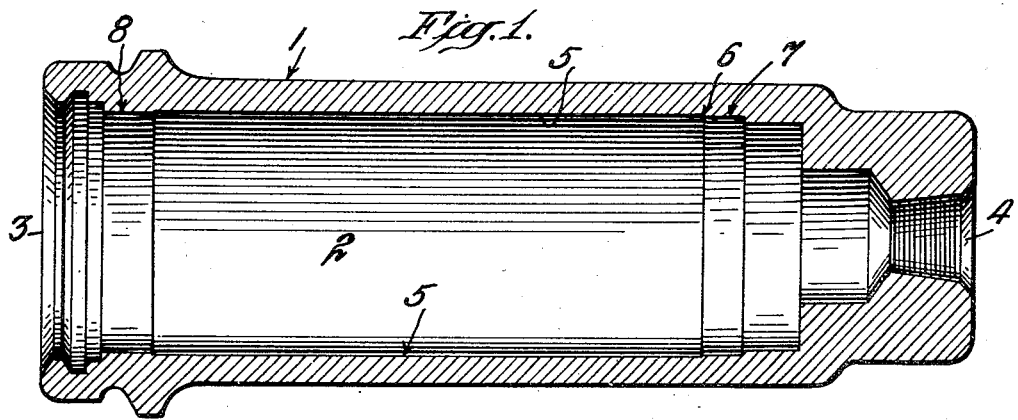
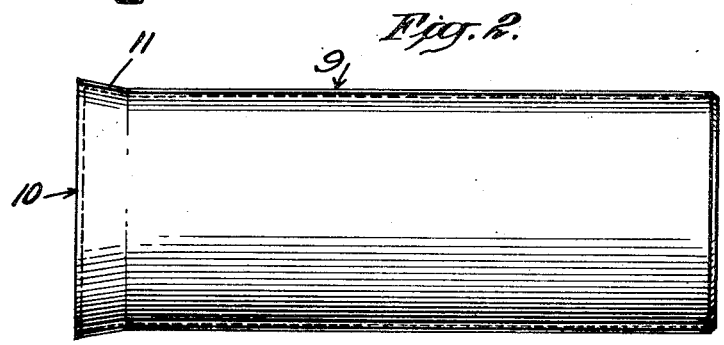
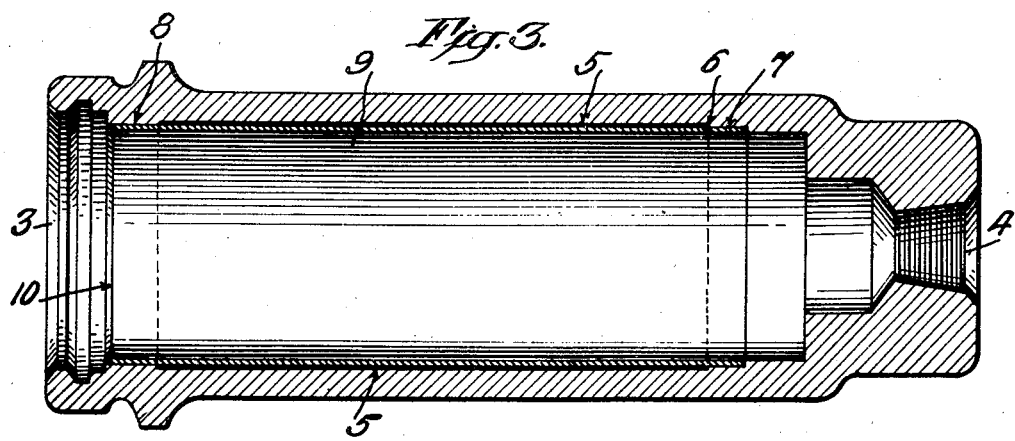
INVENTOR
ELIS L. LARSON
BY Harry Lea Dodson
ATTORNEY Patented Dec. 17, 1946

2,412,587

UNITED STATES PATENT OFFICE 2,412,587

CYLINDER LINER

Elis L. Larson, Chicago, Ill.

Application November 15, 1945, Serial No. 628,794

4 Claims. (Cl. 309—3)

My invention relates to hydraulic brake systems on motor vehicles and more particularly to the master and wheel cylinders employed in such systems.

It is well known to the trade that in use the inner wall of the cylinder becomes pitted and worn. The wear takes place in the center part of the cylinder so that normal go and no-go gauges cannot indicate the amount of this wear and mere replacement of cups and pistons does not overcome leaky and faulty brake cylinders. The pitted condition is due to corrosion of some kind, which has not as yet been accurately determined and when such corrosion is greater than .004 in depth, oversize cups and pistons must be used or the cylinder must be scrapped.

It is normal practice to hone the original cylinders out two or three times, but when this honing reaches a maximum of approximately .007 greater in diameter than the original size the standard pistons and washers do not operate efficiently and failure of the braking system is very likely.

To scrap the cylinder requires a new master cylinder, this is quite an expensive repair operation. It has been proposed to re-bore the inner wall of the cylinder, but this results in the necessity of having oversize pistons and cup-washers. This in turn requires new molds and dies and also would require a duplication of stocks in the field which is quite impracticable.

My invention has for its object to provide a construction which will entirely overcome the above objections and will obviate the need for new pistons, washers, etc., and yet will produce a cylinder equal in all respects to a new one.

I propose to accomplish this and avoid the difficulty by reboring the cylinder to such size as will eliminate all pits and wear, and then bring the inner diameter of the cylinder back to its original size by inserting a sleeve in the cylinder. This sleeve is spaced from the wall of the cylinder except for a very short distance at each end.

My invention has for its further object to provide a means for holding the sleeve in place in a manner which will make it possible to remove it and replace it with another sleeve when worn, or a pitted condition occurs.

My means of accomplishing the foregoing objects may be more readily understood by reference to the accompanying drawing which is hereunto annexed and forms a part of this application in which:

Fig. 1 is a vertical section of a master cylinder bored for my construction;

Fig. 2 is an elevation of a tubular sleeve to be installed in the cylinder shown in Fig. 1, and Fig. 3 is a vertical section of the cylinder shown in Fig. 1, with the sleeve in place.

Similar reference numerals refer to similar parts throughout the entire specification.

As shown in the drawing the master cylinder 1, has a central longitudinal bore 2, and openings 3 and 4, at each end. The openings 3 and 4 at the ends are provided with the usual recesses to receive the various valves etc., of the braking system.

Normally this is the standard construction, but when the inner wall of the bore 2, becomes pitted instead of re-boring and/or honing the wall 5, I bore it out as clearly shown in the drawing.

At the end 6, of the bore I form an annular shoulder 7, which is on a smaller radius than the end 6, of said bore. Preferably this shoulder should be approximately one-fourth inch wide axially.

I have found in practice that if the shoulder 7, is that wide it will perform its function admirably. It is possible that a condition may arise where a wider shoulder may be desirable and/or others where a narrower one will suffice.

The principal feature of my invention and which I have found in actual practice insures success is to reduce the surface contact of the liner with the wall of the cylinder by having it support the tubular sleeve only at each end thereof the remainder of the sleeve being spaced by a shoulder from the wall, and that such support shall be very much shorter axially than the tubular sleeve itself.

Another important feature of my invention is to have one end of the sleeve tapering outwardly forming a truncated conical portion of greater diameter than the sleeve, so that when compressed, by being forced into position, the metal will tend to distend thus forming a tight joint. Should it become necessary to replace this sleeve with a new one, due to wear or a pitted condition, it has been found in practice that it can be removed very easily, in view of the fact that the press fit exists only for the short distance of approximately one-quarter of an inch. This distance however, is approximate but has been found to be the most satisfactory distance. It can be longer or shorter, if desired.

Having prepared the master cylinder as described, I insert the tubular sleeve 9 shown in Fig. 2. This tubular sleeve has an outside diameter which will constitute a press fit for the internal diameter of the shoulder 7, but except for such contact it is spaced from the wall 5; this fit to the shoulder should be such that when pressed home it will withstand a pressure of approximately one thousand pounds. This internal wall of the tubular sleeve 5, preferably is ground and/or honed to fit the piston (not shown) which operates in the master cylinder.

As has been pointed out one end 10 of the tubular sleeve 9 tapers outwardly for approximately one-quarter of an inch, as at 11, in Fig. 2, so that it is larger in diameter than the end 8 of the wall 5.

When the tubular sleeve is forced into position in the master cylinder the tapered portion disappears, forming a gravity tight fit between the outer surface of the tubular sleeve and the wall of the master cylinder. This is due to the fact that this portion of the sleeve will be under compression, and the resiliency of the steel will form a tight union with the cylinder wall. Practice has shown this gravity tight joint is sufficient.

I am aware that it has been proposed to line cylinders of gas engines to compensate for wear. In the case of a gas engine the problem is entirely different.

For example, in United States patent to Ford, No. 2,279,671, the patentee sets forth as a condition that the liner must have "an intimate contact between cylinder wall and liner along the entire area of their mating surfaces." It is obvious no such condition exists in a hydraulic braking system.

Jackson's United States Patent No. 1,321,792, recognizes the difficulties of inserting and/or removing a liner to meet such condition and proposes a loose fit with grooves to be filled with lubricating "oil or other temperature conducting means" and then bolting the liner in place by means of a removable head. Such construction would be useless in the master cylinder of a braking system where no such condition exists for there is no need to cool the surface of the cylinder which is engaged by the piston. For that reason there is no need for an "intimate contact" between the liner and wall of the cylinder, as a consequence I have found in practice that it is amply sufficient to support a tubular sleeve in a master cylinder, of a hydraulic braking system, at each end, the remainder of said sleeve being spaced from the cylinder wall.

I have found in practice that the shoulder 7, need only be a few thousands smaller in diameter than the outside diameter of the tubular sleeve to form a tight joint and that the other end need only be tight enough to prevent a gravity leak.

So far I have only described my invention as directed specifically to a used, worn or pitted master cylinder of a hydraulic braking system. I do not however, wish to be understood as limiting myself to such, since it may be found in practice that my improvement can be equally useful in new cylinders, as well as reconditioned ones. In such an event, when the surface of the tubular sleeve becomes pitted, or worn, all that is necessary would be to knock out the tubular sleeve and insert a new one and the user would have, to all intents and purposes a new master cylinder, this can be done in the field with some very simple tools and reconditioning could be done by any competent mechanic with very little loss of time.

Because of this reason I do not desire to be limited to the specific details as described except as such limitations may appear in the hereinafter appended claims.

Having described my invention what I regard as new and desire to secure by Letters Patent is:

1. A cylinder lining comprising the combination thereof with a cylinder having a longitudinal inner bore of larger diameter than said liner, a shoulder on the said inner bore adjacent one end of said cylinder which press fits said liner, one end of said liner tapering outwardly, whereby when pressed into position the tapered portion will be compressed forming a tight union with the cylinder wall.

2. A cylinder lining comprising the combination thereof with the master cylinder of a hydraulic braking system having a longitudinal inner bore of larger diameter than said liner, a shoulder on the said inner bore adjacent one end of said cylinder onto which said liner is pressed tightly, one end of said liner tapering outwardly, whereby when pressed into position the tapered portion will be compressed forming a tight union with the cylinder wall.

3. A new article of manufacture, a master cylinder for hydraulic braking systems consisting of a metal cylinder having an inner bore which extends axially thereof an annular shoulder adjacent one end of said bore, a tubular sleeve of smaller diameter than said bore, one end of said sleeve being press fitted to and coinciding with said shoulder, and engaging therewith, the other end of said sleeve tapering outwardly to form a truncated conical portion of greater diameter than the sleeve so that when pressed into intimate relation with the annular wall of said master cylinder the tapered portion will be under compression, whereby the resilience of the metal will form a tight union with the wall of the cylinder.

4. In a new article of manufacture, a master cylinder of substantially uniform bore having a shoulder formed in one end thereof, a tubular sleeve of a diameter adapted to telescopically fit into the bore of said cylinder and be supported on one end by said shoulder, said sleeve having an annular portion on the other end thereof operative to be moved into intimate annular contact with the inner wall of the end of the bore of said cylinder when said liner is forced into said cylinder.

ELIS L. LARSON.